(12) United States Patent
Klein

(10) Patent No.: US 6,564,961 B1
(45) Date of Patent: May 20, 2003

(54) TRAPEZOIDAL FLUID STORAGE TANK

(76) Inventor: Richard Klein, 816 S. Cucamonga Ave., Ontario, CA (US) 91761

( * ) Notice: Subject to any disclaimer, the term of this patent is extended or adjusted under 35 U.S.C. 154(b) by 0 days.

(21) Appl. No.: 10/238,012

(22) Filed: Sep. 9, 2002

(51) Int. Cl.$^7$ .............. B60P 3/00; B62D 33/00; B65D 58/12
(52) U.S. Cl. .............. 220/563; 137/574; 137/576
(58) Field of Search .............. 220/563; 137/574, 137/576

(56) References Cited

U.S. PATENT DOCUMENTS

| | | | |
|---|---|---|---|
| 2,806,622 A | * 9/1957 | Leirer | 220/4.14 |
| 2,860,809 A | * 11/1958 | Perry | 220/563 |
| 3,645,416 A | * 2/1972 | Main, Jr. | 220/563 |
| 4,136,973 A | 1/1979 | van der Lely | |
| 4,611,724 A | 9/1986 | Watkins et al. | |
| 4,789,170 A | * 12/1988 | Reber | 280/838 |
| D348,304 S | 6/1994 | Norman, Jr. et al. | |
| 5,361,930 A | 11/1994 | Perry | |
| D378,810 S | 4/1997 | Norman, Jr. et al. | |
| 5,630,625 A | 5/1997 | Shaw | |
| D379,948 S | 6/1997 | Wade | |
| 5,637,233 A | 6/1997 | Earrusso | |
| 5,779,092 A | * 7/1998 | Hehn et al. | 220/563 |
| 5,960,981 A | * 10/1999 | Dodson et al. | 220/563 |
| 6,367,648 B1 | * 4/2002 | Boone, Jr. et al. | 220/563 |

* cited by examiner

Primary Examiner—Joseph M. Moy
(74) Attorney, Agent, or Firm—Lewis M Brande; Thomas A McCleary; Brande & McCleary (57) ABSTRACT

A fluid storage tank that comprises a tank shell. The tank shell is fabricated from a top, a bottom, a front end cap, a rear end cap, a first side, and a second side. The tank shell has an interior defining an open volume inside. The tank shell is supported by at least one baffle that is fastened onto the tank shell. The top has a hatch that contains a conventional hinge means and is capable of being latched by a conventional latch means. A drain hole is located on the bottom of the tank, or on a bottom sump that is attached onto the bottom of the fluid storage tank assembly. The top and the bottom of the tank assembly are generally parallel in relationship. The first side and the second side of the tank assembly are both attached to the top and the bottom of the tank assembly. The top is shown smaller than the bottom creating a trapezoidal shape.

6 Claims, 6 Drawing Sheets

TRAPEZOIDAL FLUID STORAGE TANK

BACKGROUND OF THE INVENTION

1. Field of the Invention

Fluid storage tanks are used in a variety of areas. Common are those seen on trucks transporting a variety of fluids such as liquid nitrogen, milk, water, and other liquids. The most common type of truck is a trailer rig which is towed by a tractor rig. Other common types include fluid storage tanks mounted on a truck chassis similar to a 4×4 or 6×6. These type of vehicles are common to carrying fuel oil or diesel to fill homes with heating oil or tanks for generators. Construction sites use fluid storage tanks mounted on trucks to wet down the dry earth in order to prevent dust from intruding on nearby neighborhoods.

Most tanks have an elliptical cross-section and extend for some length, which provides the volume desired by the user. Other tanks have rectangular or square cross sections with rounded corners. Many of the previously described shaped tanks have a lower portion that extends downwards, and provides the ability to gravity drain the fluid to a central point on the tanker without the use of accessory pumps to drain the liquids from the tanker.

In order to prevent catastrophic failures of the tanks, internal baffles are installed into the tankers to reduce the pressure head of the fluid in motion, which in turn will reduce the amount of force on the front or rear caps, preventing the fluid from bursting through the fluid storage tank.

When the tankers are taken over very rough roads, there is substantial danger that the trailers or the truck may overturn because of its high center of gravity since the center of gravity is generally along the geometric center of the cross section, which is mounted high over the chassis of the truck.

2. Description of the Prior Art

Fluid storage tanks are known in the prior art.

U.S. Pat. No. 4,136,973 by van der Lely discloses a MOBILE DEVICE FOR TRANSPORTING LIQUID SUBSTANCES. The patent describes a cylindrical tank that has guide members disposed inside, where the guide members are positioned in such a was as to promote mixing of the liquid and solid matter enclosed therein when the vehicle stops its forward motion. The inertia of the material inside the tank causes a surge that forces the liquid over the inclined guide member and promotes mixing. The additional motions of the vehicle causes swirling and recirculating motions to further mix the solid and semi-solid matter. The patent is primarily describing a tank for transporting a mixture of manure and a further liquid, usually water.

U.S. Pat. No. 4,611,724 by Watkins et al., discloses a FLUID-STORAGE TANK. This patent discloses a tank for storing fluids. This tank is disclosed having a generally rectangular cross section with a number of reinforced internal baffles. The internal baffles are positioned so that access to each bay is on alternating sides. While the patent initially discloses an elongated shell, the primary disclosure of the patent is the geometry of the baffle(s) used to support the shell of the tank. The baffle disclosed is geometrically defined as a convexo-concave shell having 2 points of inflection where the concave portion has at least 1 horizontal planar rib to support and stabilize the baffle(s). The baffle(s) have 2 convex shapes and one concave shape joined together as one piece.

U.S. Pat. No. 5,630,625 by Shaw discloses a TANK TRUCK. This patent discloses a fuel delivery truck that has a pair of tag wheels that lift up when the amount of liquid in the tanks is reduced to a minimum point. This allows the tanker to turn with a smaller radius than it would with an additional pair of wheels on the ground at the rear of the vehicle. An additional disclosure is to position the hose assembly at the front of the tank, with a corresponding overhang, which maintains the overhang of the rear mounted hoses.

SUMMARY OF THE INVENTION

The purpose of the present invention is to provide a fluid storage tank that maximizes the volume of the fluid carried while substantially lowering the center of gravity of the tank.

It is a further object of the present invention to provide improved visibility for the driver by moving the mirrors closer to the cab, since the trapezoidal shape is smaller at the top of the tank than at the bottom.

The object of this invention will be achieved by providing an elongated shell, where the shell is in the shape of a trapezoid. The top of the trapezoid is smaller than the bottom of the trapezoid, which will noticeably lower the center of gravity of the tanker truck or trailer. The trapezoidal tank has an upper and a lower portion and is permanently attached to the side portions. The side portions may be identical, which will reduce overall tooling and part costs. The lower portion of the tank may have an additional reservoir, or sump. The reservoir or sump would fit between the rails of the truck or trailer chassis and further lower the center of gravity. Baffles would be attached to the external shell supporting the structure, and they would provide needed protection from the fluid building a large pressure head when the vehicle is stopped or started.

DETAILED DESCRIPTION

Figure 1:
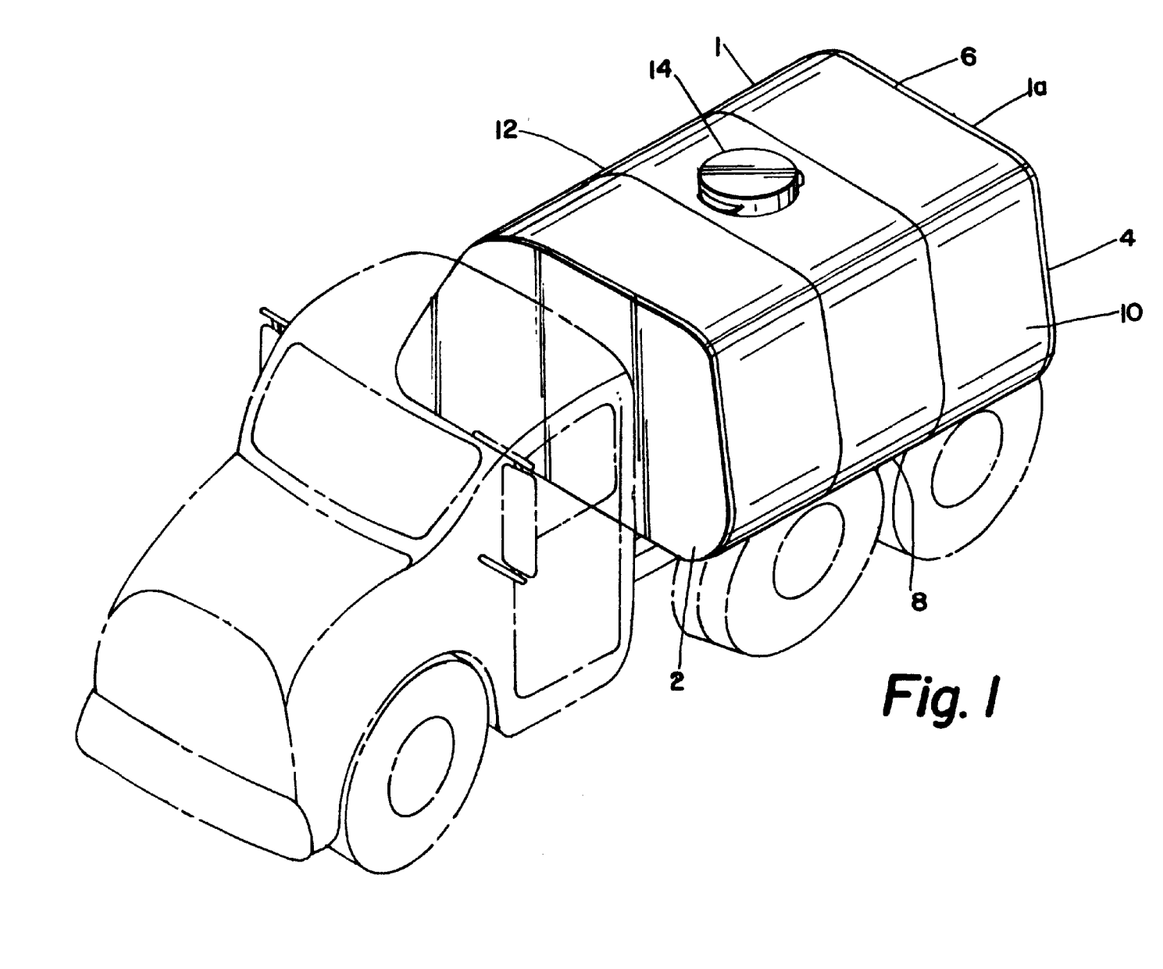
FIG. 1 shows the tank assembly mounted on a truck chassis.

In referring to figure one, a tank assembly (1) is portrayed. The tank assembly consists of a tank shell (1a) which is described as symmetrical and trapezoidal in shape, the tank shell (1a) further having an interior (1b) defined therein. The tank shell (1a) has a front end cap (2), a rear end cap (4), a top (6), and a bottom (8). The top (6) and the bottom (8) of the tank assembly (1) are defined as generally having a parallel relationship. The tank assembly (1) has a first side (10) and a second side (12), the first side (10) opposing the second side (10) of the tank assembly (1). The front end cap (2) opposes the rear end cap (4). Mounted on the top (6) of the tank assembly (1) is a hatch (14), where the hatch (14) uses a conventional hinge means (16) [see FIG. 3] to allow the hatch to be easily opened. The hatch (14) is secured to the tank assembly (1) by a latch means (18), where the latch means (18) [see FIG. 3], and the hinge means (16) are well known in the art.

Figure 2:
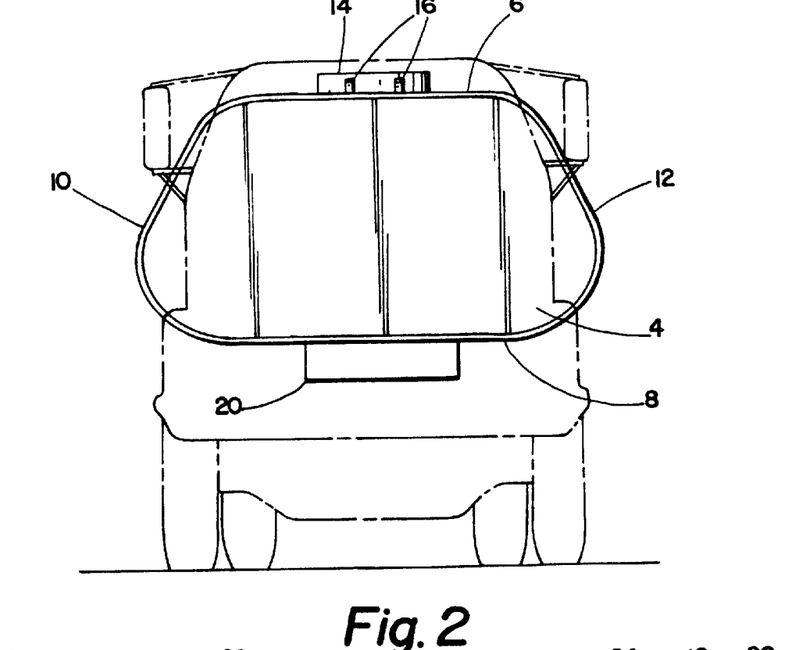
FIG. 2 shows a rear view of the tank assembly.
Figure 6:
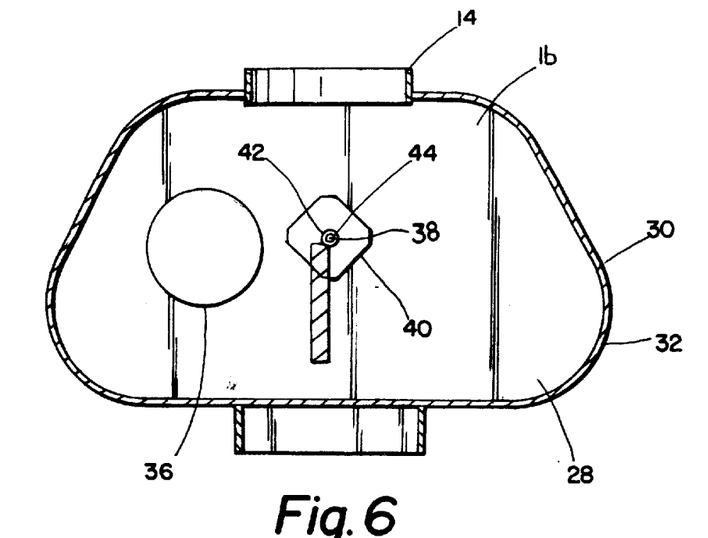
FIG. 6 shows an cross sectional view of the tank assembly showing 1 baffle.

In referring to figure two, the top (6) of the tank assembly (1) is shown smaller than the bottom (8) of the tank assembly (1) thereby defining the trapezoidal shape of the tank assembly (1), when viewed in a cross sectional view (see figure six (6)). The first side (10) of the tank assembly (1) is shown attached to the top (6) and the bottom (8) of the tank assembly (1), and the second side (12) of the tank assembly (1) is also shown attached to the top (6) and the bottom (8) of the tank assembly (1). The general means that is used to attach the components to each other, the top (6) to the first side (10) and the second side (12), and the bottom (8) to the first side (10) and the second side (12) is a weldment, although other means to attach such as mechanical means may be used. Weldments offer the best method of sealing the interfaces between mating components of assemblies in order to prevent fluids from leaking out from the tank assembly (1). In order to simplify the manufacture of the tank assembly (1) the first side (10), and the second side (12) of the tank assembly (1), which are the two (2) non-parallel sides, may be identical or nearly identical in manufacture. Since the tank assembly (1) is trapezoidal it can be seen that the driver has enhanced visibility, with an increase in tank capacity when compared to other tank assemblies that are known in the art.

The bottom (8) of the tank assembly (1) is shown with a bottom sump (20). The bottom sump (20) is shown generally rectangular in shape, and positioned equidistant from the first side (10) and the second side (12) of the tank assembly (1). The bottom sump (20) is shown extending from the front end cap (2) to the rear end cap (4), although the tank manufacturer may reduce the overall size of the bottom sump(20) by ending the bottom sump (20) before the front end cap (2) and/or the rear end cap (4). Positioning the bottom sump (20) by this method drastically lowers the center of gravity of the tank assembly (1) when it is filled with fluid, which will then increase the overall stability of a truck that has this tank assembly (1) mounted.

Figure 3:
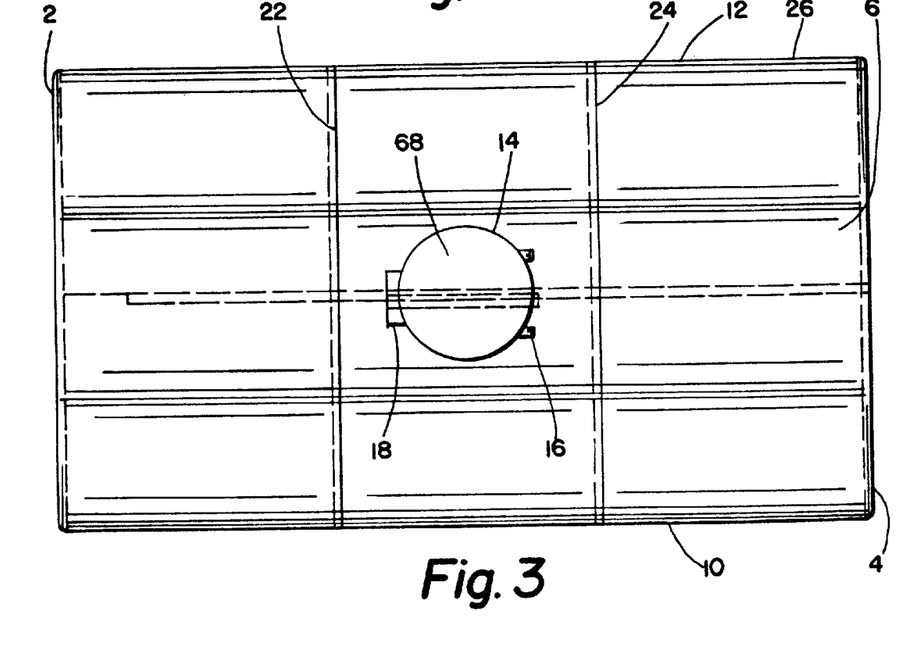
FIG. 3 shows a top view of the tank assembly.

In referring to figure three, a general arrangement of the tank assembly (1) is shown the front end cap (2) is shown attached to the top (6), the first side (10) and the second side (12), where the rear end cap (4) is shown attached to the top (6), the first side (10) and the second side (12). The top (6) of the tank assembly (1) has a hole (68) centrally defined therein, the hole (68) providing access to the interior (1b) of the tank assembly (1). Centrally mounted to the top (6) of the tank assembly (1) is the hatch (14). The tank size (volume) is the determining factor in the number of baffles required for the tank assembly (1). The drawings show two (2) baffles, but it is common to have a tank with one (1) baffle. Shown mounted in the current tank assembly (1) is a first baffle (22) and a second baffle (24). Conventional wisdom dictates that the best attachment method for the first baffle (22) and the second baffle (24) to a tank shell (26) is welding as it eliminates any holes necessary for the use of mechanical attachments. The tank shell (26) is defined as the interior surface of the tank assembly (1).

Figure 4:
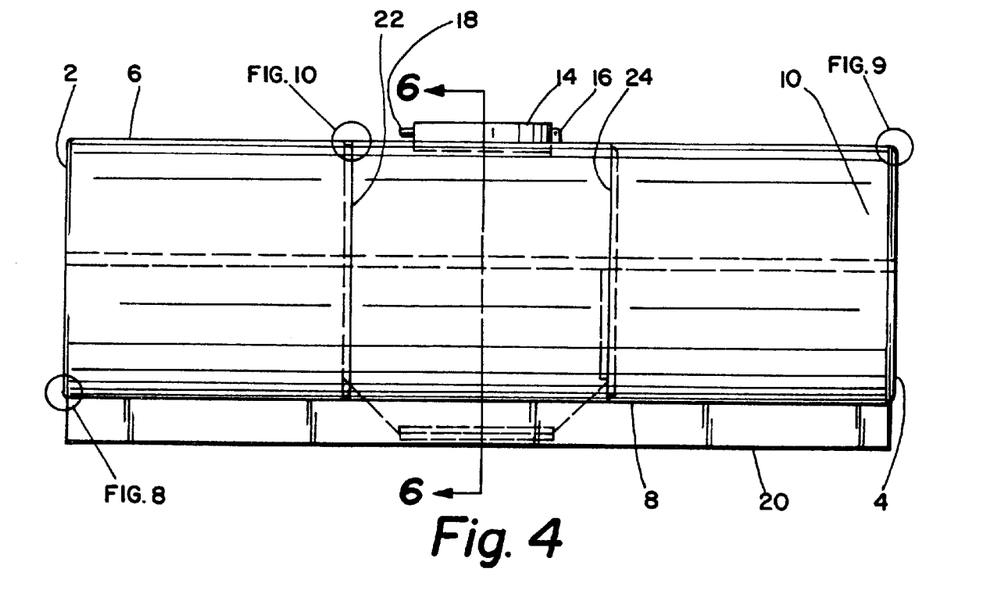
FIG. 4 shows a side view of the tank assembly.

In referring to figure four (4), a side view of the tank assembly (1) is shown. The front end cap (2), the rear end cap (4), the top (6), the bottom (8), the first side (10), and the bottom sump (20) are shown. The first baffle (22), and the second baffle (24) are shown positioned vertically inside the tank assembly (1).

In referring to figure six (6), a baffle (28) is shown. The baffle (28) is shown having a shape complimentary to the tank shell (26). The baffle (28) has a perimeter (30), the perimeter (30) is on an external portion (32) of the baffle (28). The external portion (32) of the baffle (28) has a flange (34), the flange (34) may be continuous around the entire perimeter (30) of the baffle (28) and is attached to the tank shell (1b) by conventional means. The baffle (28) has a through hole (36) defined therein. The through hole (36) is offset from a center (38) of the baffle (28). Centrally mounted on the baffle (28) is a stiffening plate (40). The stiffening plate (40) may be welded to the baffle (28), or it may be mechanically fastened to the baffle (28). The baffle (28) and the stiffening plate (40) have a central hole (42) defined therethrough, the central hole (42) allowing a support member (44) to pass therethrough and stabilize the baffle (28).

Figure 7:
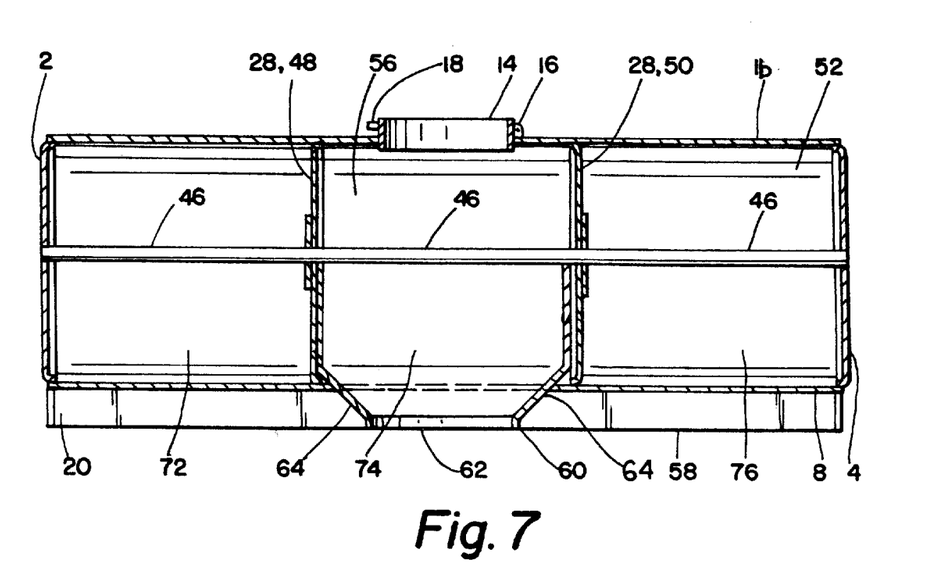
FIG. 7 shows a longitudinal cross-sectional view depicting the tank assembly arrangement.
Figure 8:
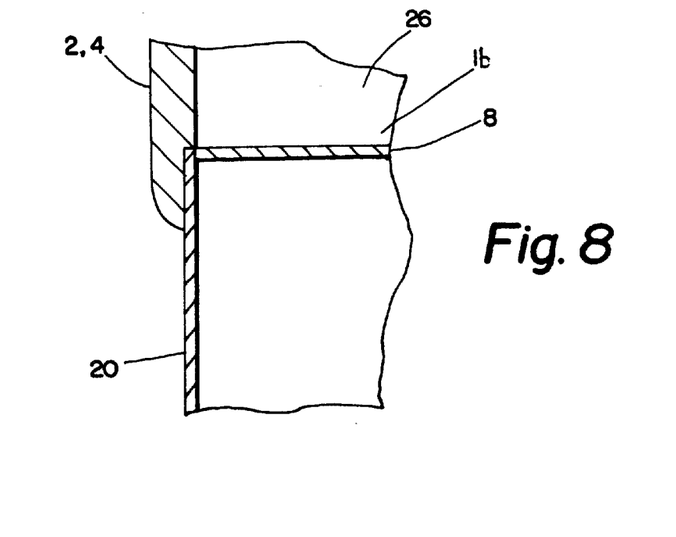
FIG. 8 shows a corner of the tank assembly showing the front end cap attachment to the tank assembly floor.

In FIG. 7, a stabilizing beam (46) is attached to the front end cap (2) and the rear end cap (4). The stabilizing beam (46) passes through the central hole (42) in the baffle (28) and the stiffening plate (40). The stabilizing beam (46) is attached to the baffle (28) and end plate (40) by welding or mechanical means. If the tank assembly (1) is large enough, where the liquid would create too great a pressure head on acceleration or deceleration, two (2) baffles (28) would be installed into the tank assembly (1). The orientation of a first baffle (48) would be opposite of a second baffle (50). The through hole (36) in the first baffle (48) would not face the through hole (36) in the second baffle (50). This would break up the pressure head because the fluid would have to make two ninety degree turns to go from an aft bay (52) to a forward bay (54), through a central bay (56).

Figure 11:
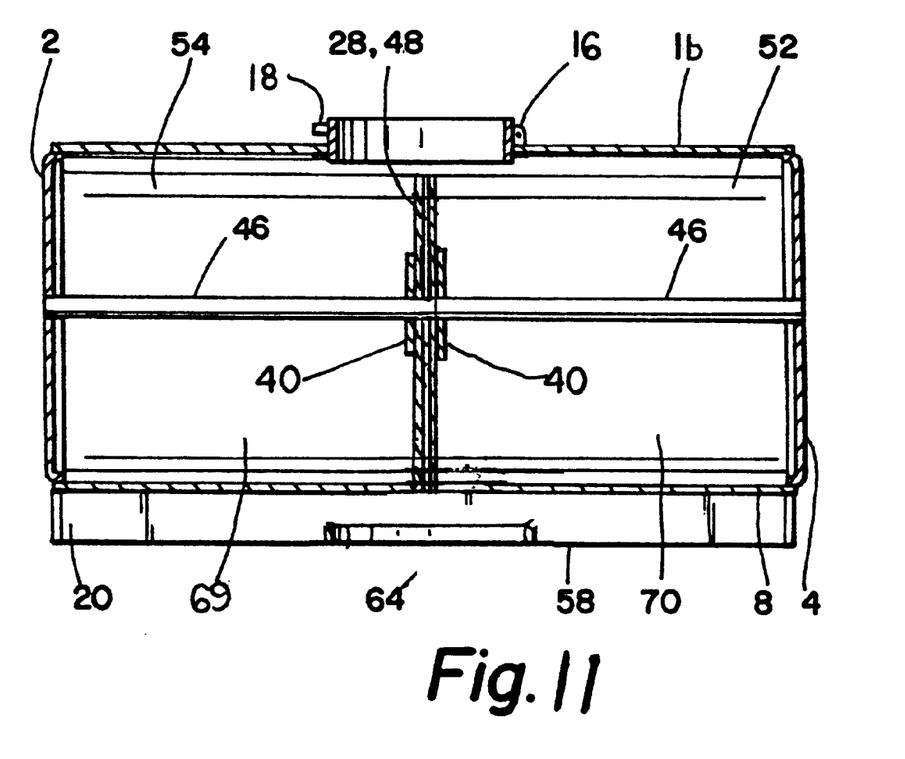
FIG. 11 shows a cross sectional view of a two bay tank assembly.

In a two bay tank, i.e a tank with one (1) Baffle (28), a first longitudinal baffle (69) longitudinally bisects the first bay (54) and is attached to the front end cap (2), the stabilizing bar (46), the baffle (28), and the bottom (1), of the tank assembly. A second longitudinal baffle (70) longitudinally bisects the second bay (52) and is attached to the rear end cap (4), the stabilizing bar (46), the baffle (28), and the bottom (8), of the tank assembly (1). The first longitudinal baffle (69), and the second longitudinal baffle (70) are attached to the components of the tank assembly (1) by conventional means such as welding.

In a three bay tank, i.e. a tank with two (2) baffles (28), a first longitudinal baffle (72) longitudinally bisects the forward bay (54) and is attached to the front end cap (2), the stabilizing bar (46), the first baffle (48), and the bottom (1), of the tank assembly (1). A second longitudinal baffle (74) longitudinally bisects the central bay (56) and is attached to the first baffle (48), the stabilizing bar (46), the second baffle (56), and the bottom (1), of the tank assembly (1). A third longitudinal baffle (76) longitudinally bisects the aft bay (52) and is attached to the rear end cap (4), the stabilizing bar (46), the second baffle (50), and the bottom (1), of the tank assembly (1). The purpose of the longitudinal baffles is to minimize the sloshing of liquid when the vehicle is in motion on off-road surfaces.

In a two bay tank, the bottom sump (20) volume communicates with the forward bay (54) and the aft bay (52).

In a three bay tank, the bottom sump (20) describes a volume that communicates with the forward bay (54), the central bay (56), and the aft bay (52) allowing additional liquid to be stored therein, thereby lowering the center of gravity of the tank below the standard center of gravity position of a trapezoidal body.

Figure 5:
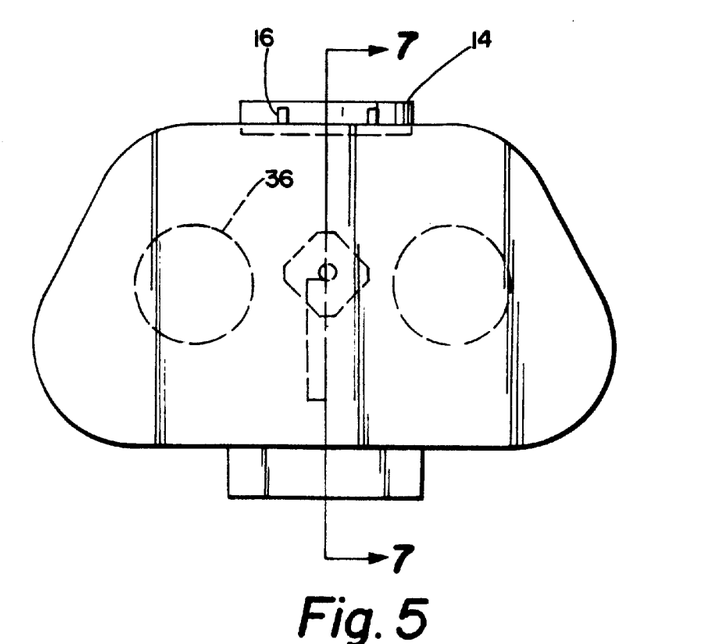
FIG. 5 shows an end view of the tank assembly with an internal baffle and bottom sump shown.

The bottom sump (20) has a bottom (58). Centrally located on the bottom (58) of the bottom sump (20) is a mounting flange (60). The mounting flange (60) provides structural support for the bottom sump (20) when a pump system is installed. The mounting flange (60) and the bottom (58) of the bottom sump (20) have a drain hole (62) defined therein, the drain hole (62) communicating with the pump system (not shown).

In a two bay tank, the baffle (28) is attached to the mounting flange (60) providing structural stability and preventing the sump from deflecting under load from a fluid filled tank.

In a three bay tank, the first baffle (48) has a first support member (64) attaching the first baffle (48) to the mounting flange (60) in the bottom sump (20). The second baffle (50) has a second support member (66) attaching the second baffle (50) to the mounting flange (60), positionally opposite from the first support member (64). The first support member (64) and the second support member (66) each provide structural stability to the mounting flange (60) in the bottom sump (20).

Figure 9:
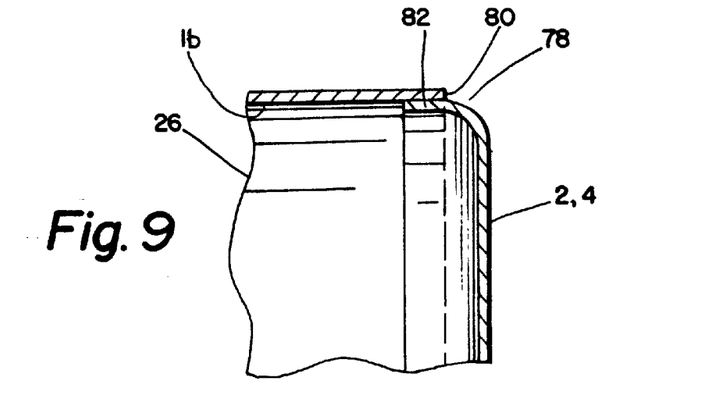
FIG. 9 shows a detailed view of the rear end cap attachment to the tank assembly.
Figure 10:
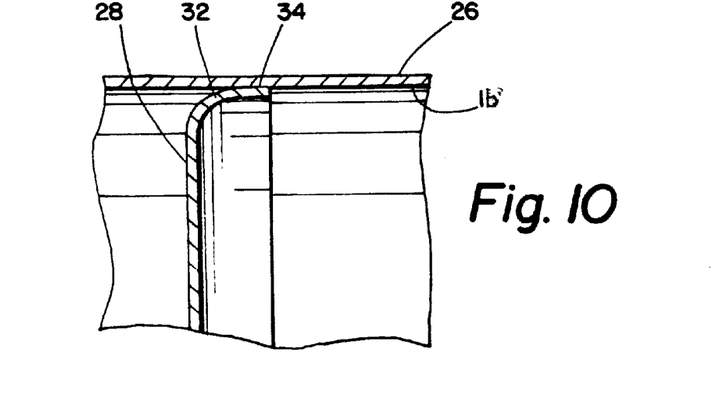
FIG. 10 shows a detailed view of the internal baffle attachment to the tank assembly.

Figure nine (9) shows the method of attaching the front end cap (2) and the rear end cap (4). The front end cap (2) and the rear end cap (4) are shown having a shape complimentary to the tank shell (26). The front end cap (2) and the rear end cap (4) each have a perimeter (78), the perimeter (78) is on an external portion (80) of the front end cap (2) and the rear end cap (4). The external portion (32) of the baffle (28) has a flange (82), the flange (82) may be continuous around the entire perimeter (78) of the front end cap (2) and the rear end cap (4) and is attached to the tank shell (1b) by conventional means. By making the flange (82) of the front end cap (2) and the rear end cap (4) continuous around the perimeter (78) of the front end cap (2) and the rear end cap (4), a fluid tight seal is easily created thus preventing fluid leaks.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A trapezoidal fluid storage tank comprising:
    a. a tank shell, said tank shell comprising a top, a bottom, a first side, a second side, a front end cap, and a rear end cap, said top being attached to said first side and said second side, said bottom also being attached to said first side and said second side, said top and said bottom being in a generally parallel relationship, said top being smaller than said bottom when viewed in a cross sectional view, said front end cap being attached to said top, said first side, said second side and said bottom, said rear end cap being attached to said top, said first side, said second side and said bottom, said first side opposing said second side, and said front end cap opposing said rear end cap, said tank shell further defining an interior therein;
    b. said top of said fluid storage tank having a centrally located hole defined therein, said top of said fluid storage tank further having a hatch means, said hatch means being centrally mounted on said top of said fluid storage tank over said centrally located hole, said hatch means having a standard hinge means to allow said hatch means to be opened and closed, said hatch means being secured in a closed position by a standard latch means, said hatch means allowing access to said interior of said tank shell or to the interior of said tank assembly through said centrally located hole in said top;
    c. a baffle, said baffle having a shape complementary to said tank shell, said baffle having a perimeter, said perimeter being defined as an external portion of said baffle, said perimeter having a flange defined thereon, said flange being attached to said tank shell, said baffle having a through hole defined therein, said through hole being located offset from a central axis of said baffle, a stiffening plate, said stiffening plate being located along said central axis of said baffle at a central point of said baffle, said stiffening plate being attached to said baffle, said stiffening plate and said baffle having a through hole defined therethrough, said through hole allowing a stabilizing beam to penetrate therethrough, said stabilizing beam being attached to said baffle and said stiffening plate, a first end of said stabilizing beam is attached to said front end cap, a second end opposing said first end of said stabilizing beam is attached to said rear end cap providing structural stability to said baffle when fluid in said tank assembly presses upon said baffle, said baffle being centrally located within said tank assembly defining a forward bay and an aft bay; and
    d. said bottom having a drain hole defined therein, said bottom further having a mounting flange defined thereon, said mounting flange providing structural stability for said drain hole and additionally providing support for an installed pump system (not shown).

2. The trapezoidal fluid storage tank as in claim one (1) further comprising:
    a. a first longitudinal baffle, said first longitudinal baffle attaching to said front end cap, said stabilizing bar, said baffle, and said bottom of said tank assembly; and
    b. a second longitudinal baffle, said second longitudinal baffle attaching to said rear end cap, said stabilizing bar, said baffle, and said bottom of said tank assembly, thereby minimizing side to side sloshing of liquid in said tank assembly.

3. The trapezoidal fluid storage tank as in claim one (1) further comprising:
    a. a first baffle and a second baffle, said second baffle being oriented one hundred and eighty degrees from said first baffle thereby offsetting said through holes of said first baffle and said second baffle causing fluid in said tank assembly to make two ninety degree turns and reducing the pressure head of the fluid stored therein;
    b. said first baffle and said second baffle creating a forward bay, a central bay, and a rear bay, said first baffle having a first support member attached thereon, said first support member attaching said first baffle to said mounting flange of said drain hole mounted on said bottom, said second baffle having a second support member attached thereon, said second support member attaching said second baffle to said mounting flange of said drain hole mounted on said bottom.

4. The trapezoidal fluid storage tank as in claim three (3) further comprising:
   a. a first longitudinal baffle, said first longitudinal baffle attaching to said front end cap, said stabilizing bar, said first baffle, and said bottom of said tank assembly, bisecting said forward bay of said tank assembly;
   b. a second longitudinal baffle, said second longitudinal baffle attaching to said first baffle, said stabilizing bar, said second baffle, and said bottom of said tank assembly, bisecting said central bay of said tank assembly; and
   c. a third longitudinal baffle, said third longitudinal baffle attaching to said rear end cap, said stabilizing bar, said second baffle, and said bottom of said tank assembly, bisecting said aft bay of said tank assembly.

5. The trapezoidal fluid storage tank as in claim two (2) and four (4) further comprising:
   a. a bottom sump, said bottom sump being attached to said bottom of said tank assembly, said bottom sump having a volume said volume of said bottom sump communicating with said forward bay and said aft bay of said tank assembly thereby allowing additional liquid to be stored therein, said additional liquid lowering the center of gravity of said tank assembly; and
   b. said bottom sump having a drain hole defined therein, said bottom sump further having a mounting flange defined thereon, said mounting flange providing structural stability for said drain hole and additionally providing support for an installed pump system (not shown).

6. The trapezoidal fluid storage tank as in claim five (5), further comprising:
   said first baffle having a first support member, said first support member attaching to said mounting flange of said bottom sump, said second baffle having a second support member, said second support member attaching to said mounting flange of said bottom sump, said second support member being oriented positionally opposite to said first support member.

* * * * *